United States Patent
Kato

(10) Patent No.: US 11,387,032 B2
(45) Date of Patent: Jul. 12, 2022

(54) COIL COMPONENT MANUFACTURING METHOD, COIL COMPONENT, AND DC-TO-DC CONVERTER

(71) Applicant: Murata Manufacturing Co., Ltd., Nagaokakyo (JP)

(72) Inventor: Noboru Kato, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 965 days.

(21) Appl. No.: 16/003,139

(22) Filed: Jun. 8, 2018

(65) Prior Publication Data
US 2018/0294088 A1    Oct. 11, 2018

Related U.S. Application Data

(63) Continuation of application No. PCT/JP2017/000827, filed on Jan. 12, 2017.

(30) Foreign Application Priority Data

Jan. 28, 2016   (JP) .............................. JP2016-014232

(51) Int. Cl.
*H01F 27/29*    (2006.01)
*H01F 27/24*    (2006.01)
(Continued)

(52) U.S. Cl.
CPC ............. *H01F 27/24* (2013.01); *H01F 17/04* (2013.01); *H01F 27/2823* (2013.01);
(Continued)

(58) Field of Classification Search
CPC .......... H01F 27/24; H01F 17/04; H01F 41/04; H01F 27/2823; H01F 27/29;
(Continued)

(56) References Cited

U.S. PATENT DOCUMENTS

| | | | | |
|---|---|---|---|---|
| 4,696,100 A | * | 9/1987 | Yamamoto | ............ H01F 17/045 29/605 |
| 6,189,204 B1 | * | 2/2001 | Shikama | ............... H01F 27/027 29/605 |

(Continued)

FOREIGN PATENT DOCUMENTS

| | | |
|---|---|---|
| JP | 11-354364 A | 12/1999 |
| JP | 2001-257125 A | 9/2001 |

(Continued)

OTHER PUBLICATIONS

Official Communication issued in International Patent Application No. PCT/JP2017/000827, dated Mar. 14, 2017.

*Primary Examiner* — Mang Tin Bik Lian
(74) *Attorney, Agent, or Firm* — Keating & Bennett, LLP

(57) ABSTRACT

A coil component manufacturing method includes embedding coils in a flat plate-shaped element body defined by a molded body including magnetic particles such that the coils are in a matrix and winding axes of the coils extend in a thickness direction of the element body, one end portion of each of the coils is exposed to one main surface of the element body, and the other end portion of each of the coils is exposed to the other main surface of the element body, forming electrode films defining input/output terminals on both main surfaces of the element body so as to make contact with one of the end portions of each of the coils, and performing segmentation into individual coil components by cutting the element body at location between the coils adjacent to each other in the thickness direction.

14 Claims, 13 Drawing Sheets

(51) Int. Cl.
- *H01F 17/04* (2006.01)
- *H01F 41/04* (2006.01)
- *H01F 27/28* (2006.01)
- *H01F 41/02* (2006.01)
- *H01F 41/10* (2006.01)
- *H02M 3/04* (2006.01)
- *H02M 3/155* (2006.01)

(52) U.S. Cl.
CPC ......... *H01F 27/29* (2013.01); *H01F 41/0266* (2013.01); *H01F 41/04* (2013.01); *H01F 41/10* (2013.01); *H02M 3/04* (2013.01); *H01F 2017/048* (2013.01); *H02M 3/155* (2013.01)

(58) Field of Classification Search
CPC ................. H01F 41/0266; H01F 41/10; H01F 2017/048; H01F 27/255; H01F 27/324; H01F 17/045; H01F 27/292; H02M 3/04; H02M 3/155; H02M 3/003
See application file for complete search history.

(56) References Cited

U.S. PATENT DOCUMENTS

| | | | |
|---|---|---|---|
| 6,311,387 B1 | 11/2001 | Shikama et al. | |
| 2003/0206089 A1* | 11/2003 | Shikama | H01F 17/045 336/221 |
| 2007/0063803 A1* | 3/2007 | Yamashita | H01F 17/045 336/83 |
| 2009/0065594 A1* | 3/2009 | Kato | H01Q 1/242 235/492 |
| 2010/0259353 A1* | 10/2010 | Saito | H01F 41/005 336/205 |
| 2010/0314455 A1* | 12/2010 | Kato | H01Q 1/50 235/492 |
| 2014/0176286 A1* | 6/2014 | Okada | C04B 35/265 336/200 |
| 2014/0184374 A1* | 7/2014 | Park | H01F 17/0013 336/83 |
| 2016/0035476 A1* | 2/2016 | Mimura | H01F 17/0006 336/199 |
| 2017/0018351 A1* | 1/2017 | Yatabe | H05K 3/3431 |
| 2017/0162317 A1* | 6/2017 | Taniguchi | H01F 41/10 |

FOREIGN PATENT DOCUMENTS

| JP | 2005-116708 A | 4/2005 |
|---|---|---|
| JP | 2015-088545 A | 5/2015 |

\* cited by examiner

COIL COMPONENT MANUFACTURING METHOD, COIL COMPONENT, AND DC-TO-DC CONVERTER

CROSS REFERENCE TO RELATED APPLICATIONS

This application claims the benefit of priority to Japanese Patent Application No. 2016-014232 filed on Jan. 28, 2016 and is a Continuation Application of PCT Application No. PCT/JP2017/000827 filed on Jan. 12, 2017. The entire contents of each application are hereby incorporated herein by reference.

BACKGROUND OF THE INVENTION

1. Field of the Invention

The present invention relates to a method for manufacturing a coil component that is used as a power inductor of a power supply circuit, the coil component, and a DC-to-DC converter including the coil component.

2. Description of the Related Art

A known method for manufacturing a coil component of this type is disclosed in Japanese Unexamined Patent Application Publication No. 2015-88545. Japanese Unexamined Patent Application Publication No. 2015-88545 discloses a method for manufacturing a coil component in which a coil is embedded in an element body as a molded body containing magnetic particles.

The method for manufacturing the coil component in Japanese Unexamined Patent Application Publication No. 2015-88545, however, still has room for improvement from a viewpoint of manufacturing a plurality of coil components in a shorter period of time.

SUMMARY OF THE INVENTION

Preferred embodiments of the present invention provide coil component manufacturing methods capable of manufacturing a plurality of coil components in a shorter period of time, and also provide coil components.

A coil component manufacturing method according to a preferred embodiment of the present invention includes embedding a plurality of coils in a flat plate-shaped element body defined by a molded body including magnetic particles such that the coils are arranged in a matrix with winding axes of the respective coils extending in a thickness direction of the element body, a first end portion of each of the coils is exposed to a first main surface of the element body, and a second end portion of each of the coils is exposed to a second main surface of the element body facing the first main surface; forming electrode films that define input/output terminals on the first main surface and the second main surface of the element body so as to make contact with one of the first end portion and the second end portion of each of the plurality of coils; and performing segmentation into individual coil components by cutting the element body at locations between the coils adjacent to each other in the thickness direction.

A coil component according to a preferred embodiment of the present invention includes an element body having a rectangular or substantially rectangular parallelepiped shape and defined by a molded body including magnetic particles; a coil that is embedded in the element body such that a first end portion is exposed to a first surface of the element body and a second end portion is exposed to a second surface facing the first surface; a first input/output terminal provided on only the first surface and connected to the first end portion of the coil; and a second input/output terminal provided on only the second surface and connected to the second end portion of the coil.

A DC-to-DC converter according to a preferred embodiment of the present invention includes a switching element and a choke coil connected to the switching element, wherein the choke coil includes an element body having a rectangular or substantially rectangular parallelepiped shape and defined by a molded body containing magnetic particles; a coil that is embedded in the element body such that a first end portion is exposed to a first surface of the element body and a second end portion is exposed to a second surface facing the first surface; a first input/output terminal provided on only the first surface and connected to the first end portion of the coil; and a second input/output terminal provided on only the second surface and connected to the second end portion of the coil.

Preferred embodiments of the present invention provide coil component manufacturing methods capable of manufacturing a plurality of coil components in a shorter period of time.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
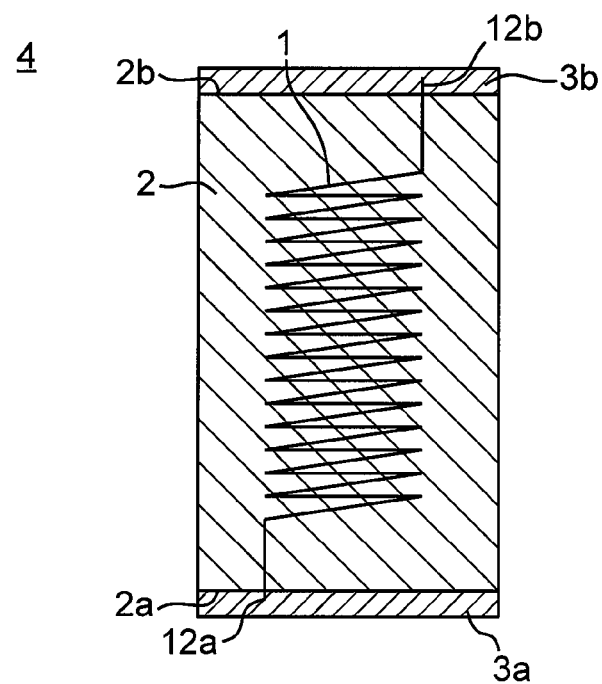
FIG. 1 is a cross-sectional view illustrating the schematic configuration of a coil component according to a first preferred embodiment of the present invention.

A coil component manufacturing method according to a preferred embodiment of the present invention includes embedding a plurality of coils in a flat plate-shaped element body defined by a molded body including magnetic particles such that the coils are arranged in a matrix with winding axes of the respective coils extending in a thickness direction of the element body, a first end portion of each of the coils is exposed to a first main surface of the element body, and a second end portion of each of the coils is exposed to a second main surface of the element body facing the first main surface; forming electrode films defining input/output terminals on the first main surface and the second main surface of the element body so as to make contact with one of the first end portion and the second end portion of each of the plurality of coils; and performing segmentation into individual coil components by cutting the element body located between the coils adjacent to each other in the thickness direction.

With this manufacturing method, the plurality of coils are embedded in the element body, the electrode films are formed, and then, the segmentation into the individual coil components is performed. Therefore, the plurality of coil components are able to be manufactured in a shorter period of time (simultaneously).

It should be noted that the electrode films may preferably be formed by plating processing, for example. In this case, the electrode films defining input/output terminals are able to be formed more easily, thus manufacturing the plurality of coil components in a shorter period of time.

It is preferable that each of the coils includes a wire wound portion wound in a spiral shape around the winding axis and a wire member defining the wire wound portion be fixed by an insulating fixing material provided between adjacent portions of the wire member. In this case, for example, even when a compression force in the winding axis direction is applied to the coils during formation of the element body, deformation of the coils is reduced or prevented. The element body is able to be formed more easily without particularly regarding the deformation of the coils.

It is preferable that each of the coils is a longitudinally elongated coil with the lengthwise direction corresponding to the winding axis direction. In this case, the number of coils that are able to be arranged in a specific area when seen from the thickness direction of the element body is able to be increased as compared to the case in which each of the coils is a laterally elongated coil with the short-side direction corresponding to the winding axis direction. As a result, the larger number of coil components are able to be manufactured in a shorter period of time.

It is preferable that each of the coils include the wire wound portion wound in the spiral shape around the winding axis, a placement portion separated from the wire wound portion, and a coupling portion coupling the wire wound portion and the placement portion, and the element body is preferably formed so as to embed the coils therein in a state in which the placement portions of the coils are located on a base and the placement portions maintain the postures of the wire wound portions extending in the winding axis direction. With this configuration, the element body is able to be formed more easily while the postures of the coils are maintained, and connection reliability between the coils and the respective input/output terminals is improved.

It is preferable that the placement portion be defined by a second wire wound portion wound in a spiral shape around the winding axis and including the smaller number of turns than the wire wound portion. With this configuration, the wire wound portion, the coupling portion, and the placement portion are able to be formed by one wire member.

A coil component according to a preferred embodiment of the present invention includes an element body having a rectangular or substantially rectangular parallelepiped shape and defined by a molded body containing magnetic particles; a coil that is embedded in the element body such that a first end portion is exposed to a first surface of the element body and a second end portion is exposed to a second surface of the element body, which faces the first surface; a first input/output terminal provided on only the first surface of the element body and connected to the first end portion of the coil; and a second input/output terminal provided on only the second surface of the element body and connected to the second end portion of the coil.

With this configuration, neither of the first and second input/output terminals is provided on the surfaces other than the first and second surfaces of the element body defined by the molded body containing the magnetic particles. Therefore, generation of eddy currents due to disposing the first input/output terminal and/or second input/output terminal on the surfaces other than the first and second surfaces is able to be reduced or prevented, thus further improving performance of the coil component.

It is preferable that the coil include a wire wound portion wound in a spiral shape around a winding axis, a connection portion separated from the wire wound portion and connected to the first or second input/output terminal, and a coupling portion coupling the wire wound portion and the connection portion, and the connection portion extends in a circumferential direction around the winding axis. With this configuration, the area in which the coil is connected to the first or second input/output terminal is larger than the cross-sectional area of a wire member defining the coil. Therefore, reliability of connection between the coil and the input/output terminal is improved.

It is preferable that the magnetic particles are magnetic metal powder and the element body is a green compact including the magnetic metal powder, for example. The green compact is provided by compression molding of the magnetic metal powder using a binder, such as resin, and the content of the magnetic metal powder in the element body is able to be increased. Therefore, a coil component in which it is hard to cause magnetic saturation and which has excellent DC superposition characteristics is provided. It should be noted that the green compact may include no resin.

A DC-to-DC converter according to a preferred embodiment of the present invention includes a switching element and a choke coil connected to the switching element, wherein the choke coil includes an element body having a rectangular or substantially rectangular parallelepiped shape and defined by a molded body containing magnetic particles; a coil that is embedded in the element body such that a first end portion is exposed to a first surface of the element body and a second end portion is exposed to a second surface facing the first surface; a first input/output terminal provided on only the first surface and connected to the first end portion of the coil; and a second input/output terminal provided on only the second surface and connected to the second end portion of the coil.

With this configuration, neither of the first and second input/output terminals is provided on the surfaces other than the first and second surfaces of the element body defined by the molded body including the magnetic particles. Therefore, generation of eddy currents due to disposing the first or second input/output terminal on the surfaces is able to be reduced or prevented, thus further improving performance of the choke coil component.

Hereinafter, preferred embodiments of the present invention will be described with reference to the drawings.

First Preferred Embodiment

The configuration of a coil component that is manufactured by a coil component manufacturing method according to a first preferred embodiment of the present invention will be described with reference to FIG. 1. FIG. 1 is a cross-sectional view illustrating the schematic configuration of the coil component.

As illustrated in FIG. 1, a coil component 4 according to the present preferred embodiment includes a coil 1, an element body 2 having a rectangular or substantially rectangular parallelepiped shape, a first input/output terminal 3a, and a second input/output terminal 3b.

The coil 1 is embedded in the element body 2 such that a first end portion 12a thereof is exposed to a first surface 2a of the element body 2 and a second end portion 12b thereof is exposed to a second surface 2b of the element body 2, which faces the first surface 2a. The coil 1 is, for example, an air-core coil defined by winding a wire member, such as a copper-based wire member, for example, into a rectangular or substantially rectangular shape when seen from above. The cross section of the wire member preferably has, for example, a rectangular or substantially rectangular (including square) shape, a circular shape, or other suitable shape. An insulating coating film may be provided on the surface of the coil 1.

The element body 2 is a molded body including magnetic particles. The element body 2 preferably includes about 85 vol % or greater of the magnetic particles, and more preferably about 95 vol % or greater, for example. The element body 2 is formed, for example, by compacting iron-based magnetic metal powder with thermosetting binder resin (for example, epoxy resin). The magnetic particles of the iron-based magnetic metal powder may preferably include, for example, manganese or chrome as an additive to iron. The element body 2 may be a molded body including no binder resin and provided by forming oxidized films as insulators on the surfaces of the magnetic particles and molding them such that crystals forming the oxidized films are combined with each other.

The first input/output terminal 3a is provided on only the first surface 2a of the element body 2 and is connected to the first end portion 12a of the coil 1.

The second input/output terminal 3b is provided on only the second surface 2b of the element body 2 and is connected to the second end portion 12b of the coil 1.

The coil component manufacturing method according to the first preferred embodiment of the present invention will be described with reference to FIGS. 2 to 9. FIGS. 2 to 9 are cross-sectional views or perspective views schematically illustrating the coil component manufacturing method according to the first preferred embodiment of the present invention.

Figure 2:
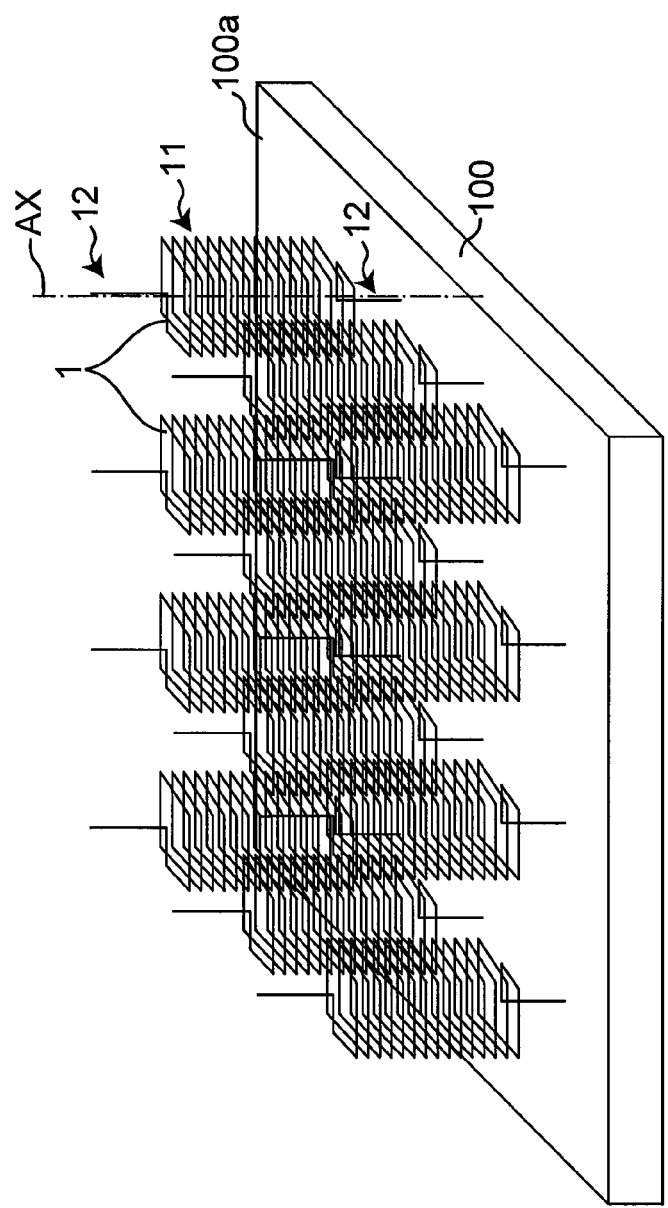
FIG. 2 is a perspective view schematically illustrating one process of a coil component manufacturing method in FIG. 1.
Figure 3:
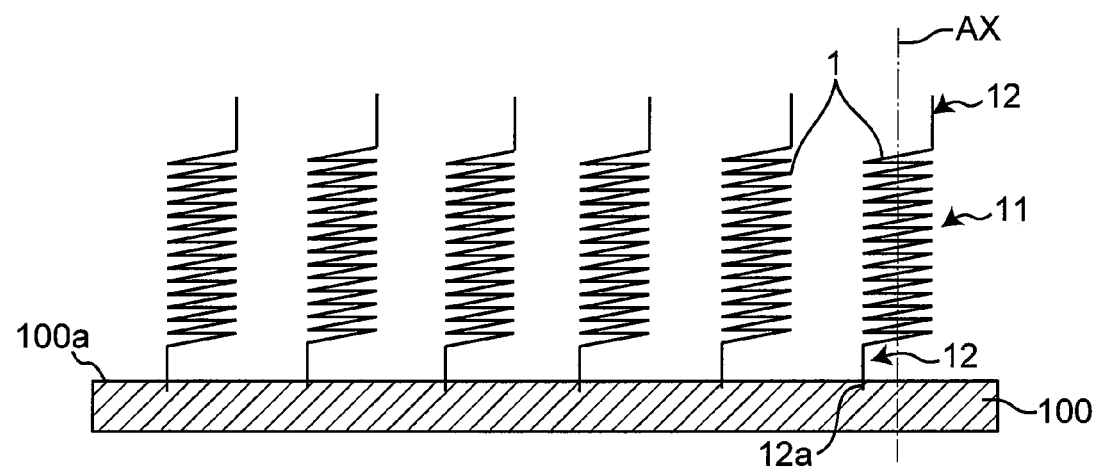
FIG. 3 is a cross-sectional view of FIG. 2.

First, as illustrated in FIG. 2, the plurality of coils 1 are provided on a base 100 in a matrix. In the first preferred embodiment, each of the coils 1 includes a wire wound portion 11 wound in a spiral shape around a winding axis AX, and a pair of linear portions 12 and 12 extending so as to be separated from both of end portions of the wire wound portion 11, as illustrated in FIGS. 2 and 3. The wire wound portion 11 and the linear portions 12 are defined by one wire member. As illustrated in FIG. 3, the respective coils 1 are arranged such that the winding axes AX are perpendicular or substantially perpendicular to a surface 100a of the base 100 by inserting the end portions 12a of one linear portions 12 into the base 100.

Figure 4:
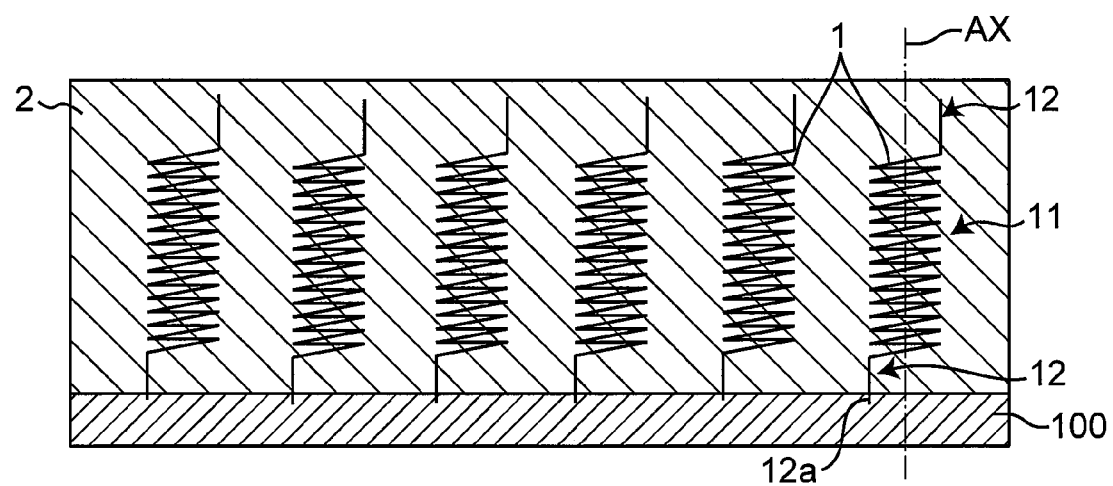
FIG. 4 is a cross-sectional view illustrating a process subsequent to FIG. 2.

Then, as illustrated in FIG. 4, the element body 2 in an unsolidified state is formed on the base 100 so as to embed therein the plurality of coils 1 and is solidified (compacted) to be integrated with the coils 1. The plurality of coils 1 are thus embedded in the flat plate-shaped element body 2. Furthermore, the respective coils 1 are arranged such that the winding axes AX extend in the thickness direction of the element body 2.

Figure 5:
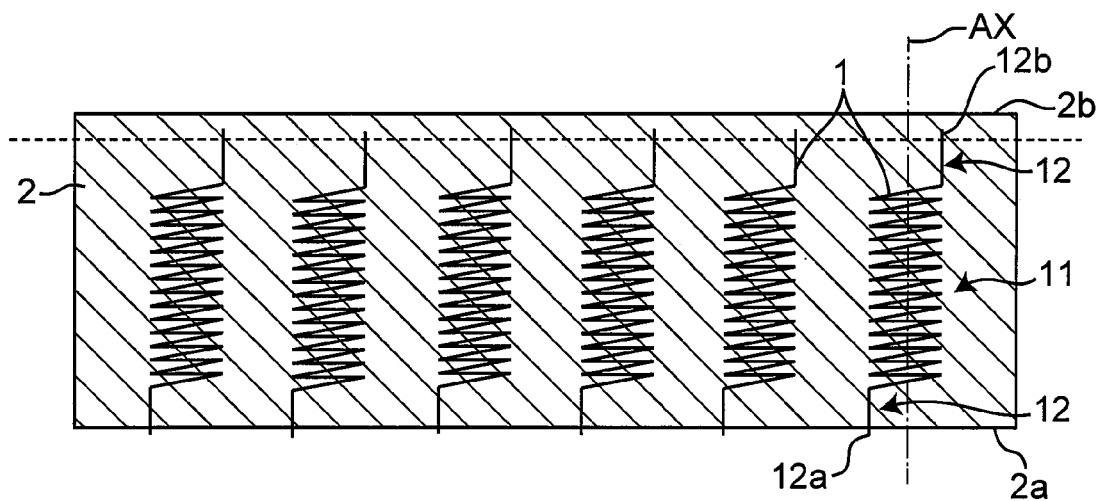
FIG. 5 is a cross-sectional view illustrating a process subsequent to FIG. 4.
Figure 6:
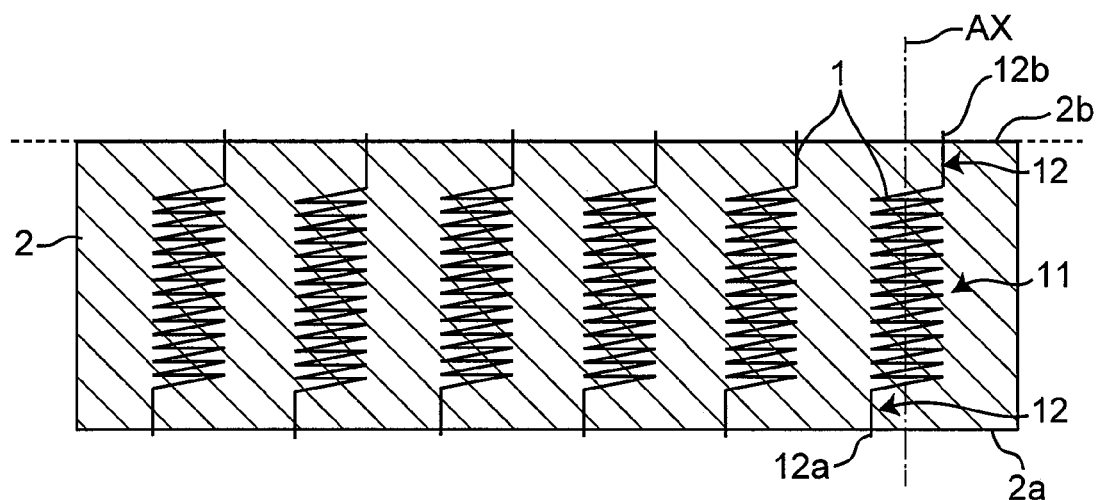
FIG. 6 is a cross-sectional view illustrating a process subsequent to FIG. 5.

Subsequently, as illustrated in FIG. 5, the base 100 is detached from the element body 2 to expose the first end portions 12a of the one linear portions 12 of the coils 1 from the one main surface 2a of the element body 2 in a projection manner. A surface layer portion of the second main surface 2b of the element body 2 is polished to expose the second end portions 12b of the other linear portions 12 of the coils 1 from the other main surface 2b of the element body 2 in a projection manner, as illustrated in FIG. 6. It should be noted that the surface layer portion of the other main surface 2b of the element body 2 may be polished by, for example, sandblasting.

Figure 7:
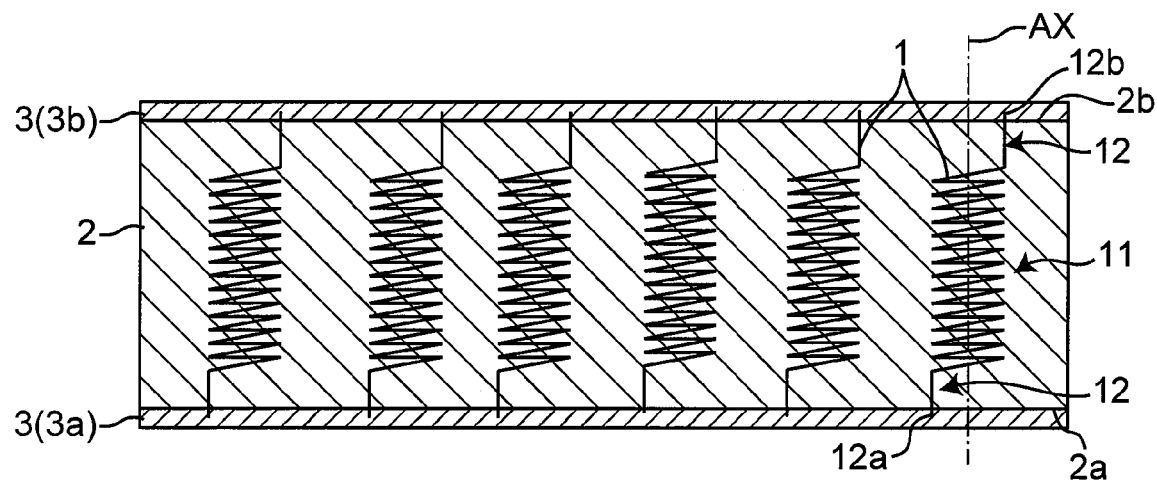
FIG. 7 is a cross-sectional view illustrating a process subsequent to FIG. 6.

Thereafter, as illustrated in FIG. 7, electrode films 3 and 3 are respectively formed on both of the main surfaces 2a and 2b of the element body 2 so as to respectively make contact with the end portions 12a and 12b of the plurality of coils 1. The respective coils 1 are thus connected to the electrode films 3 and 3. The electrode films 3 are formed by, for example, bonding metal thin films, such as copper foils, to the main surfaces 2a and 2b of the element body 2. Alternatively, the electrode films 3 may be formed by applying conductive pastes to both of the main surfaces 2a and 2b of the element body 2, and then, solidifying them. For example, plated films made of a metal material, such as nickel and gold, for example, may be formed on the electrode films 3. The electrode film 3 that is formed on the main surface 2a of the element body 2 functions as the first input/output terminal 3a. The electrode film 3 that is formed on the main surface 2b of the element body 2 functions as the second input/output terminal 3b.

Figure 8:
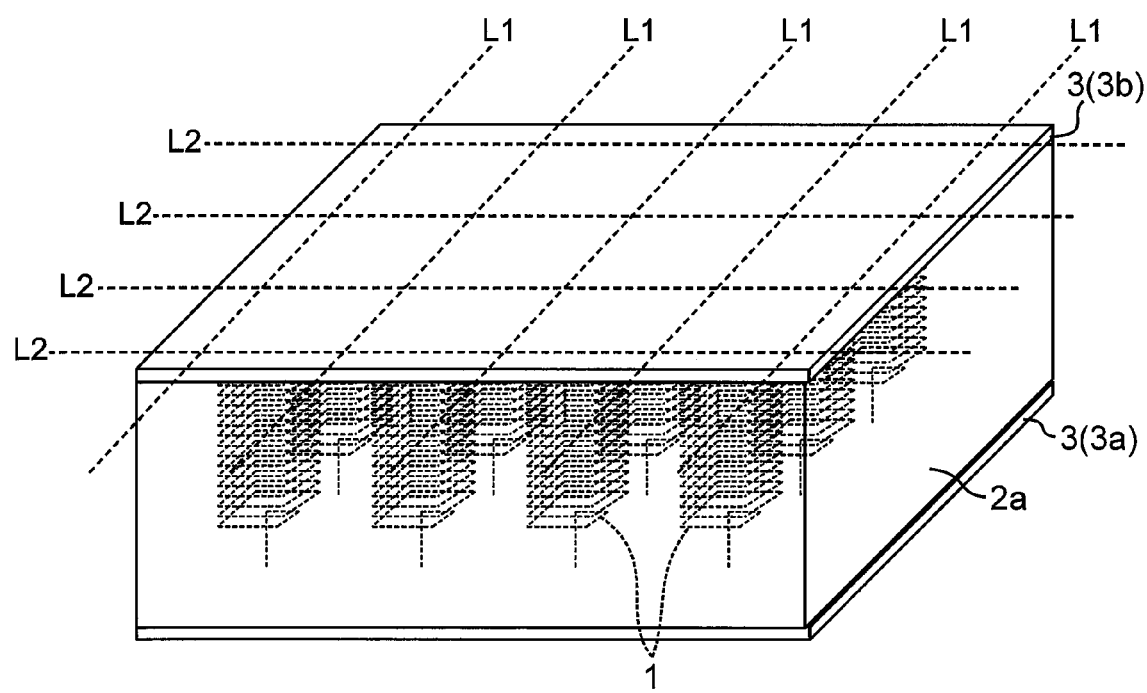
FIG. 8 is a perspective view illustrating a process subsequent to FIG. 7.
Figure 9:
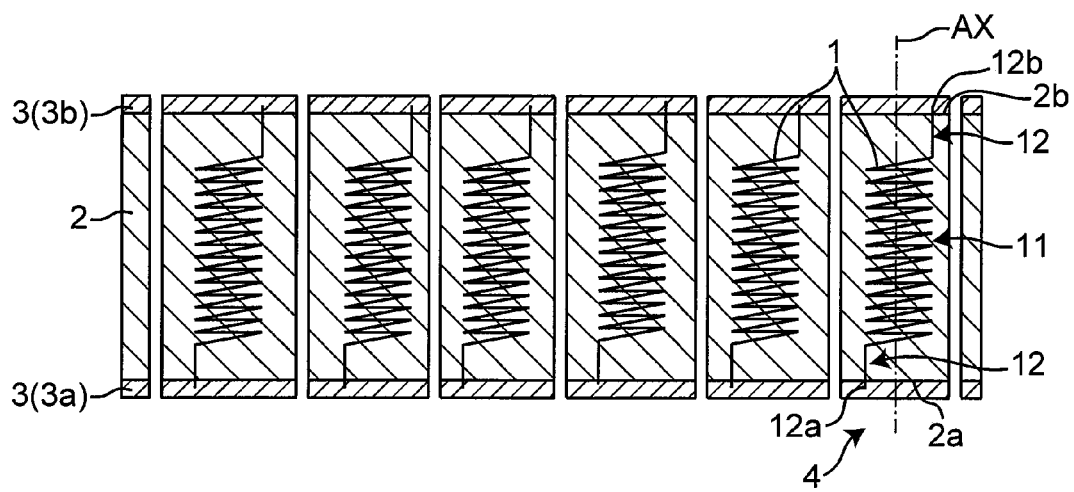
FIG. 9 is a cross-sectional view illustrating a process subsequent to FIG. 8.

Then, the electrode films 3 and the element body 2 located between the adjacent coils 1 and 1 are cut in the thickness direction along a plurality of cutting lines L1 and L2 indicated by dotted lines in FIG. 8 to be segmented into the individual coil components 4, as illustrated in FIG. 9.

With the first preferred embodiment, the plurality of coils 1 are embedded in the element body 2, the electrode films 3 and 3 are formed, and then, the segmentation into the individual coil components 4 is performed. Therefore, the plurality of coil components 4 are able to be manufactured in a shorter period of time (simultaneously).

Figure 10:
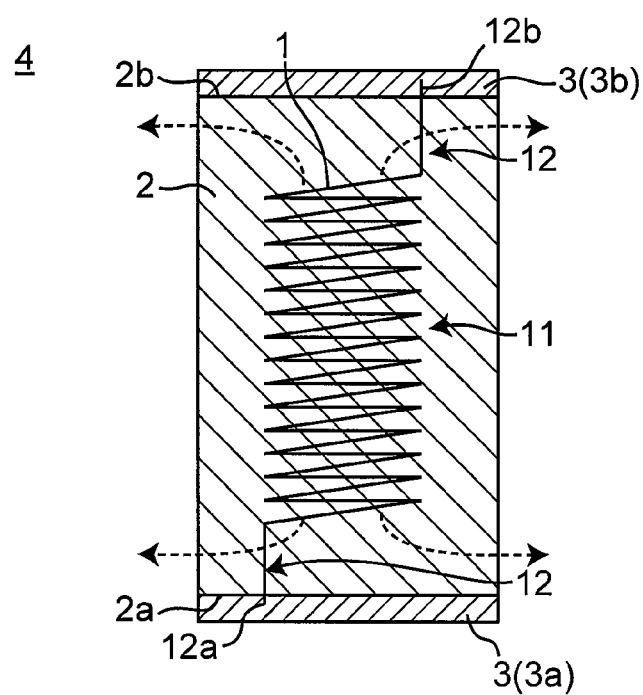
FIG. 10 is a cross-sectional view illustrating the flow of magnetic flux in the coil component in FIG. 1.

Each of the coil components 4 in the first preferred embodiment preferably has a rectangular or substantially rectangular parallelepiped shape and the coil 1 is embedded in the element body 2 such that the first end portion 12a is exposed to the first surface 2a of the element body 2 and the second end portion 12b is exposed to the second surface 2b of the element body 2, as illustrated in FIG. 10. The electrode film 3 defining the first input/output terminal 3a is formed on only the first surface 2a of the element body 2. The electrode film 3 defining the second input/output terminal 3b is formed on only the second surface 2b of the element body 2. With this configuration, the electrode film 3 is not formed on the surfaces of the element body 2 other than the first surface 2a and the second surface 2b and the flow of magnetic flux is not interfered with as indicated by arrows with dashed lines in FIG. 10. Therefore, the performance of the coil component 4 is able to be further improved.

Figure 11:
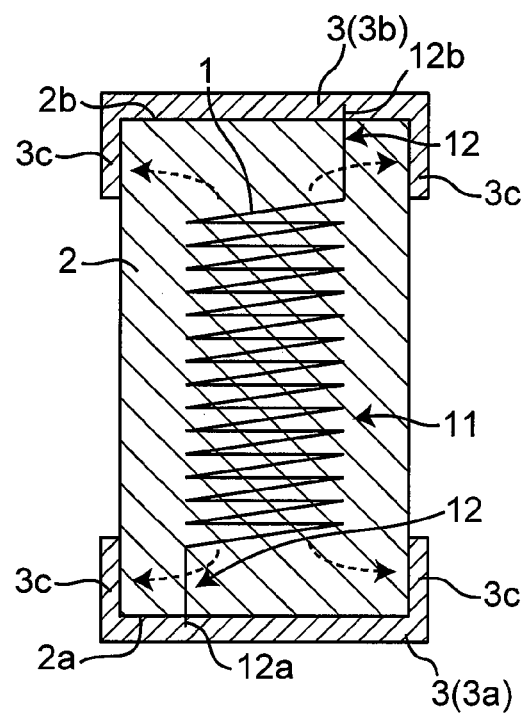
FIG. 11 is a cross-sectional view illustrating a coil component according to a comparative example.

In contrast, when a coil component includes folded portions 3c such that the electrode films 3 are also formed on the surfaces of the element body 2 other than the first surface 2a and the second surface 2b, as illustrated in FIG. 11, the flow of the magnetic flux is likely to be interfered with by the folded portions 3c as indicated by arrows with dashed lines in FIG. 11. This interference causes eddy currents to be generated and performance (for example, a Q value) of the coil component 4 is reduced and/or diminished. In particular, when the folded portions 3c are folded to be longer than those in FIG. 11 and the wire wound portion 11 and the folded portions 3c are overlapped with each other in the lateral direction (direction orthogonal or substantially orthogonal to the winding axis AX) in FIG. 11, the Q value is greatly reduced.

After the coil component 4 is mounted on a printed wiring substrate or other substrate, one electrode film 3 defines and functions as an input terminal and the other electrode film 3 defines and functions as an output terminal.

It should be noted that the present invention is not limited by the above-described preferred embodiment and may have various other configurations. For example, as described above with reference to FIGS. 5 and 6, the surface layer portion of the other main surface 2b of the element body 2 is polished to expose the other end portions 12b of the other linear portions 12 of the coils 1 from the other main surface 2b of the element body 2 in the projection manner. Preferred embodiments of the present invention are however not limited thereto. For example, when the element body 2 is formed, the element body 2 may be formed such that the end portions 12b of the other linear portions 12 of the coils 1 project from the other main surface 2b of the element body 2.

The linear portions 12 may not necessarily have the linear shapes and may have, for example, circular arc shapes. It is sufficient that the linear portions 12 have shapes that have less influence on the flow of the magnetic flux flowing out from between the wire wound portion 11 and the main surfaces 2a and 2b of the element body 2.

The end portions 12a and 12b of the linear portions 12 and 12 do not necessarily respectively project from both of the main surfaces 2a and 2b of the element body 2 and it is sufficient that they are exposed from both of the main surfaces 2a and 2b of the element body 2. For example, the surface layer portions of both of the main surfaces 2a and 2b of the element body 2 may be polished using a diamond scriber to expose the end portions 12a and 12b of the linear portions 12 and 12 from both of the main surfaces 2a and 2b of the element body 2. It should be noted that a configuration in which the end portions 12a and 12b of the linear portions 12 and 12 project from both of the main surfaces 2a and 2b of the element body 2 is more preferable because bonding strength between the electrode films 3 and the end portions of the coil 1 is improved by increasing the contact areas between the electrode films 3 and the end portions of the coil 1.

Figure 12:
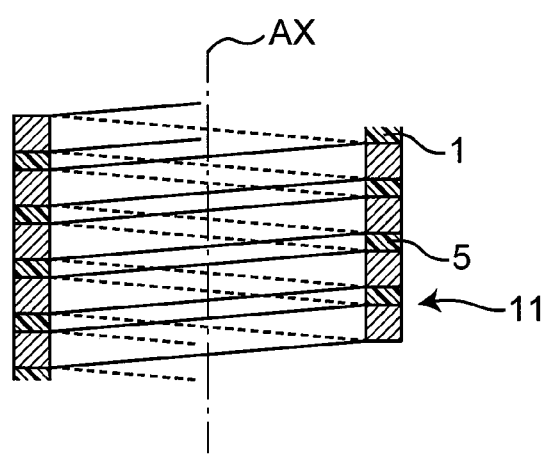
FIG. 12 is a cross-sectional view schematically illustrating a state in which an insulating fixing material is provided between portions of a wound wire configuring a coil.

It is preferable that the wire member defining the wire wound portion 11 of the coil 1 is fixed by an insulating fixing material 5, such as resin, for example, provided between adjacent portions of the wire member, as illustrated in FIG. 12. In this case, for example, even when a compression force in the winding axis direction is applied to the coils 1 during formation of the element body 2, deformation of the coils 1 is able to be reduced or prevented. The element body 2 is able to be formed more easily without particularly regarding the deformation of the coils 1.

It is preferable that the coil 1 is a longitudinally elongated coil with the lengthwise direction corresponding to the winding axis direction. In this case, the number of coils 1 that are able to be provided in a specific area when seen from the thickness direction of the element body 2 is able to be increased as compared to the case in which the coil 1 is a laterally elongated coil with the short-side direction corresponding to the winding axis direction. As a result, a larger number of coil components 4 are able to be manufactured in a shorter period of time.

Non-magnetic resin layers or resin layers having lower magnetic permeability than that of the element body 2 may be interposed between the element body 2 and the electrode films 3. Such a structure may be implemented by arranging the resin layers in an unsolidified state before or after the element body 2 is applied to the base 100, for example. The non-magnetic resin layers or the resin layers having lower magnetic permeability than that of the element body 2 between the element body 2 and the electrode films 3 cause a closed magnetic path to be provided in the element body 2. Accordingly, eddy currents due to collision of the magnetic flux with the electrode films 3 are less likely to be generated. Accordingly, deterioration in the Q value of the coil 1 is able to be reduced or prevented. When the electrode films 3 are plated films, a material having higher plating resistance than the element body 2, for example, is preferably selected as resin for the resin layers.

The coils 1 are easily disposed on the base 100 with viscosity (adhesion force) of the resin layers by arranging the coils 1 thereon after the resin layers in the unsolidified state are disposed on the base 100.

Second Preferred Embodiment

A coil component manufacturing method according to a second preferred embodiment of the present invention will be described with reference to FIGS. 13 to 18. FIGS. 13 to 18 are cross-sectional views or perspective views schematically illustrating the coil component manufacturing method according to the second preferred embodiment of the present invention. The same reference numerals denote the same or similar components as those described in the above-described first preferred embodiment and overlapping explanation thereof is omitted.

Figure 13:
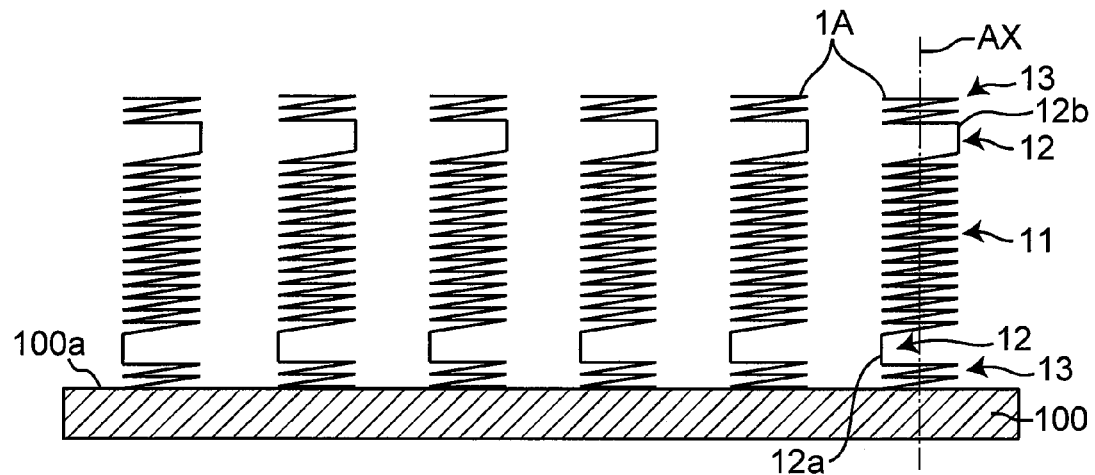
FIG. 13 is a cross-sectional view schematically illustrating one process of a coil component manufacturing method according to a second preferred embodiment of the present invention.

First, as illustrated in FIG. 13, a plurality of coils 1A are arranged in parallel or substantially in parallel (for example, in a matrix) on the base 100. Each of the coils 1A is, for example, an air-core coil configured by winding a copper-based wire member into a rectangular or substantially rectangular shape when seen from above. In the second preferred embodiment, each of the coils 1A includes the wire wound portion 11 (also referred to as a first wire wound portion) wound in the spiral shape around the winding axis AX, and the pair of linear portions 12 and 12 extending so as to be separated from both of end portions of the wire wound portion 11, as illustrated in FIG. 13.

Each of the coils 1A further includes second wire wound portions 13 and 13 as an example of a placement portion, which are respectively coupled to the end portions 12a and 12b of the pair of linear portions 12 and 12. In the second preferred embodiment, the linear portions 12 define and function as coupling portions that couple the wire wound portion 11 and the second wire wound portions 13. The second wire wound portions 13 are wound in a spiral shape around the winding axis AX and include the smaller number of turns than that of the wire wound portion 11. The wire wound portion 11, the linear portions 12, and the second wire wound portions 13 are formed by one wire member in a vertically and horizontally symmetrical manner. As illustrated in FIG. 13, the respective coils 1A are arranged such that the winding axes AX are perpendicular or substantially perpendicular to the surface 100a of the base 100 by placing one second wire wound portions 13 on the base 100. It should be noted that the one second wire wound portions 13 may be bonded onto the base 100 with an adhesive, for example.

Figure 14:
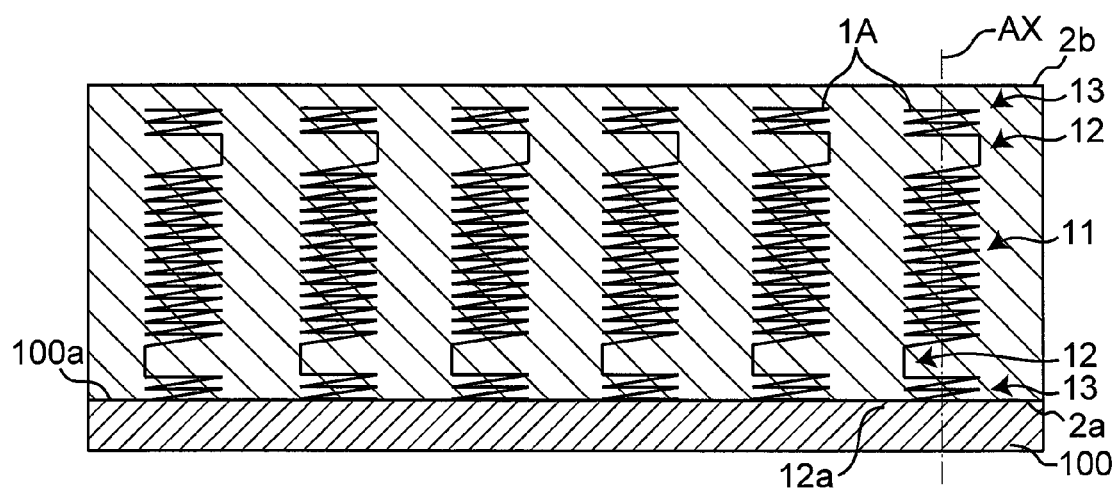
FIG. 14 is a cross-sectional view illustrating a process subsequent to FIG. 13.

Then, as illustrated in FIG. 14, the element body 2 in an unsolidified state is formed on the base 100 so as to embed the plurality of coils 1A therein and is solidified (compacted) to be integrated with the coils 1A. The plurality of coils 1A are thus embedded in the flat plate-shaped element body 2. Furthermore, the respective coils 1A are arranged such that the winding axes AX extend in the thickness direction of the element body 2.

Figure 15:
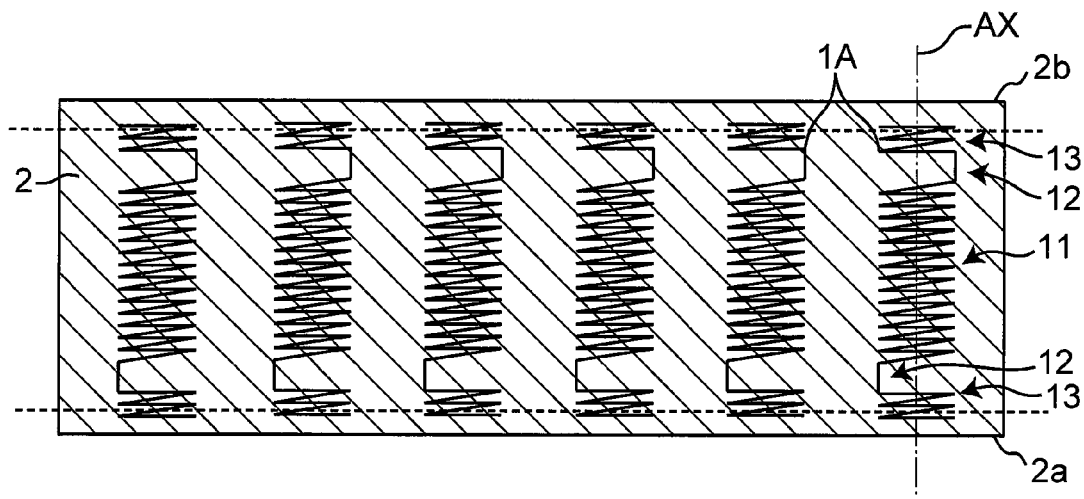
FIG. 15 is a cross-sectional view illustrating a process subsequent to FIG. 14.

Subsequently, as illustrated in FIG. 15, the base 100 is detached from the element body 2 to expose portions of the one second wire wound portions 13 from the one main surface 2a of the element body 2.

Figure 16:
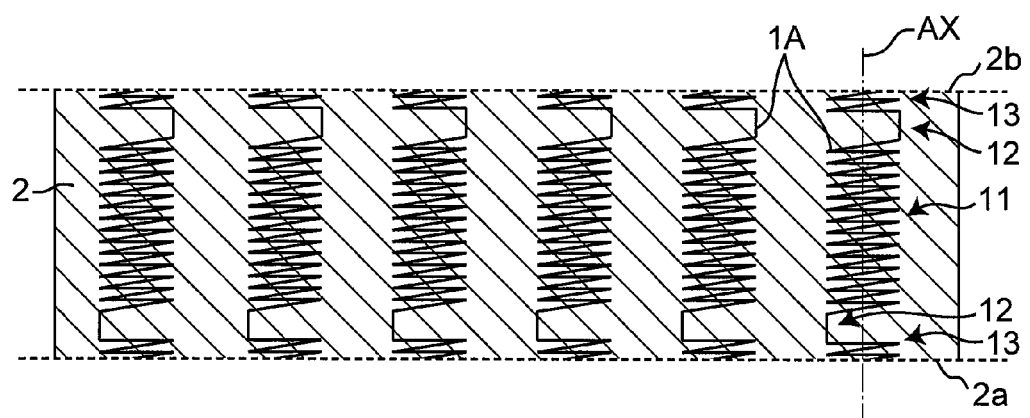
FIG. 16 is a cross-sectional view illustrating a process subsequent to FIG. 15.

Then, as illustrated in FIG. 16, a surface layer portion of the other main surface 2b of the element body 2 is polished by sandblasting or other suitable method to expose portions of the other second wire wound portions 13 from the other main surface 2b of the element body 2.

Figure 17:
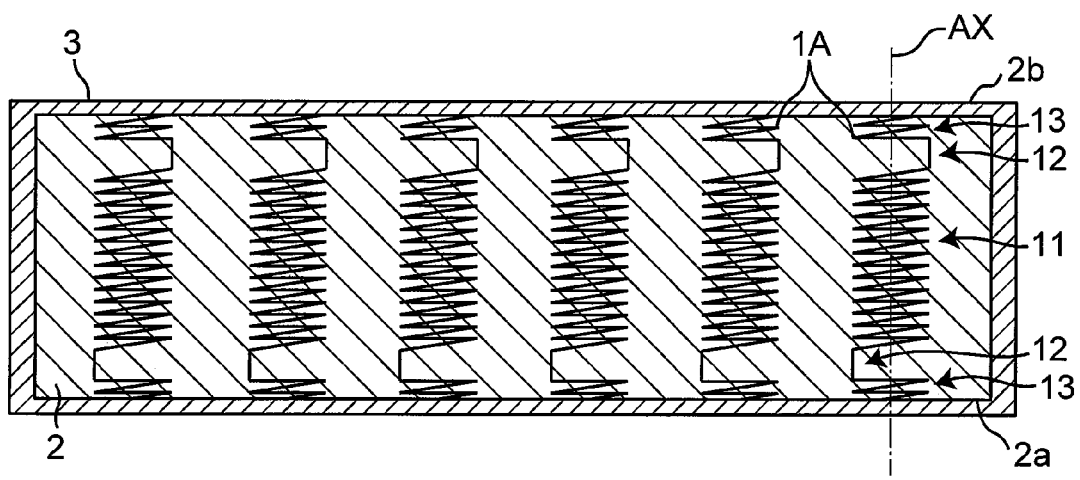
FIG. 17 is a cross-sectional view illustrating a process subsequent to FIG. 16.

Thereafter, as illustrated in FIG. 17, plating processing is performed on the entire or substantially the entire surface of the element body 2 with the plurality of coils 1A embedded therein to form the electrode film 3 defining the first or second input/output terminal 3a or 3b. For example, after the element body 2 including the plurality of coils 1A embedded therein is immersed in a plating solution, it is dried, and the electrode film 3 is formed on the entire or substantially the entire surface of the element body 2. The respective coils 1A are thus connected to the electrode film 3.

Figure 18:
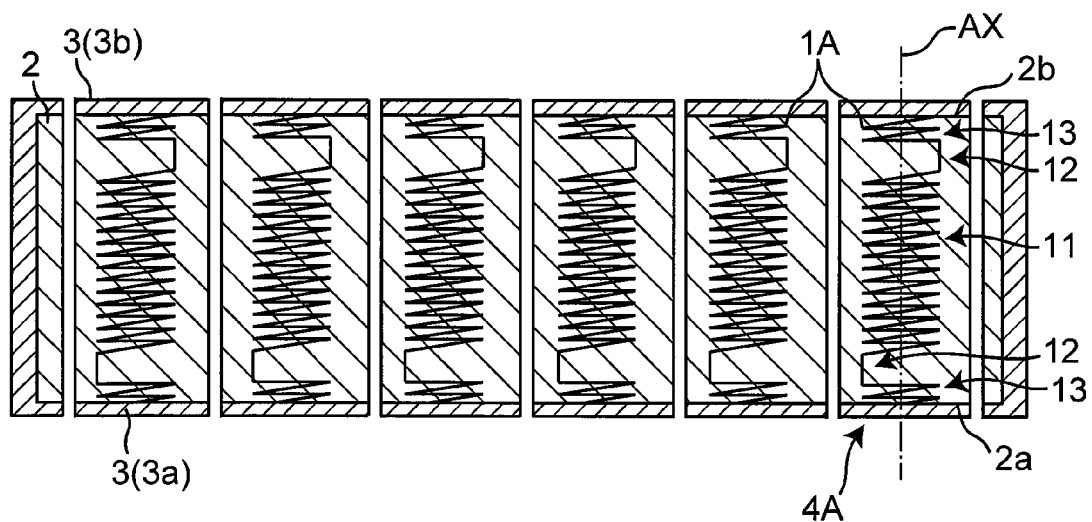
FIG. 18 is a perspective view illustrating a process subsequent to FIG. 17.

Then, the electrode film 3 and the element body 2 located between the adjacent coils 1A and 1A are cut in the thickness direction to be segmented into individual coil components 4A, as illustrated in FIG. 18.

With the second preferred embodiment, the plurality of coils 1A are embedded in the element body 2, the electrode film 3 is formed, and then, the segmentation into the individual coil components 4A is performed. Therefore, the plurality of coil components 4A are able to be manufactured in a shorter period of time (simultaneously).

With the second preferred embodiment, the electrode film 3 is preferably formed by plating processing. To be more specific, in the second preferred embodiment, after the element body 2 including the plurality of coils 1A embedded therein is immersed in the plating solution, it is dried, and the electrode film 3 as the input/output terminal is formed on the entire or substantially the entire surface of the element body 2. Thereafter, the segmentation into the individual coil components 4 is performed. The electrode film (plating) 3 that has adhered to (has abnormally deposited on) the side surfaces of the coil components 4 is removed by cutting in the segmentation. The electrode films 3 and 3 defining the first and second input/output terminals are able to be respectively formed on both of the main surfaces 2a and 2b of the element body 2 more easily (simultaneously), thus manufacturing the plurality of coil components 4A for a shorter period of time.

Furthermore, with the second preferred embodiment, the element body 2 is formed so as to embed therein the coils 1A in a state in which the one second wire wound portions 13 of the coils 1A define the placement portions on the base 100 and the second wire wound portions 13 maintain postures of the wire wound portions 11 extending in the winding axis direction. The element body 2 is therefore able to be formed more easily while maintaining the postures of the coils 1A.

With the second preferred embodiment, the placement portion is defined by the one second wire wound portion 13, and the wire wound portion 11, the linear portions 12, and the placement portion are able to be formed by one wire member.

With the second preferred embodiment, the two second wire wound portions 13 are provided in one coil 1A. Therefore, when the plurality of coils 1A are arranged on the base 100 as illustrated in FIG. 13, the respective coils 1A are able to be arranged more easily without particularly regarding the directions of the coils 1A in the winding axis direction. Preferred embodiments of the present invention are not limited to the configuration described above, and the configuration in which one second wire wound portion 13 is provided in one coil 1A may be utilized.

Figure 19:
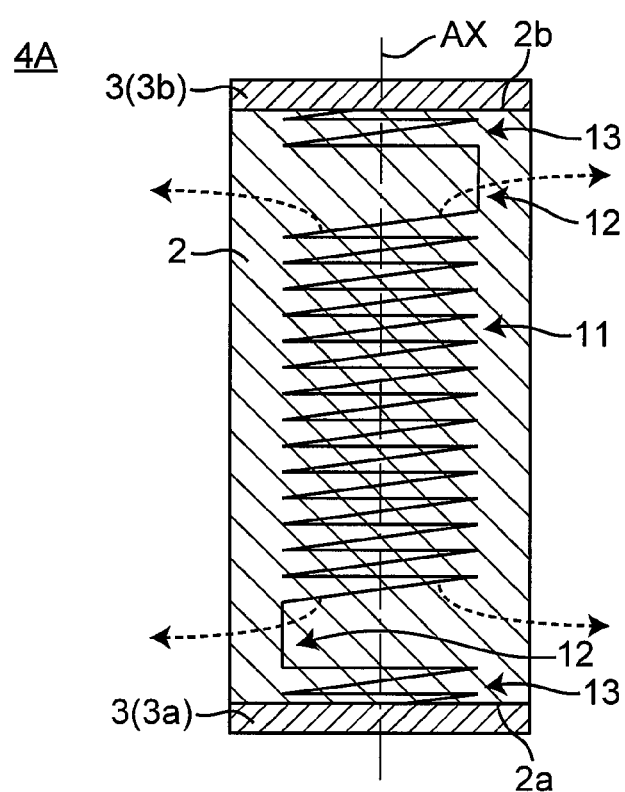
FIG. 19 is a cross-sectional view illustrating the schematic configuration of a coil component according to the second preferred embodiment of the present invention.

The coil component 4A in the second preferred embodiment preferably has a rectangular or substantially rectangular parallelepiped shape and the coil 1A is embedded in the element body 2 so as to expose a portion of the one second wire wound portion 13 to the first surface 2a of the element body 2 and expose a portion of the other second wire wound portion 13 to the second surface 2b of the element body 2, as illustrated in FIG. 19. The electrode film 3 defining the first input/output terminal 3a is formed on only the first surface 2a of the element body 2. The electrode film 3 defining the second input/output terminal 3b is formed on only the second surface 2b of the element body 2. With this configuration, the electrode film 3 is not formed on the surfaces of the element body 2 other than the first surface 2a and the second surface 2b and the flow of magnetic flux is not interfered with as indicated by arrows with dashed lines in FIG. 19. Therefore, the performance of the coil component 4A is further improved.

After the coil component 4A is mounted on a printed wiring substrate or other substrate, one electrode film 3 defines and functions as an input terminal and the other electrode film 3 defines and functions as an output terminal.

As described above with reference to FIGS. 15 and 16, a surface layer portion of the other main surface 2b of the element body 2 is polished to expose portions of the other second wire wound portions 13 from the other main surface 2b of the element body 2. Preferred embodiments of the present invention are not however limited thereto. For example, when the element body 2 is formed, the element body 2 may be formed so as to expose the portions of the other second wire wound portions 13 from the other main surface 2b of the element body 2.

When the surface layer portion of the other main surface 2b of the element body 2 is polished, portions of the other second wire wound portions 13 located in the surface layer portion may also be polished. The second wire wound portions 13 are preferably wound in the spiral shape. Therefore, even when the portions of the second wire wound portions 13 are polished, portions of remaining portions of the second wire wound portions 13 are able to be exposed from the other main surface 2b of the element body 2. In this case, the areas in which the portions of the remaining portions are exposed from the other main surface 2b of the element body 2 are larger than the cross-sectional areas of the wire members defining the coils 1A. That is to say, the areas in which the second wire wound portions 13 are connected to the electrode film 3 are enlarged. Reliability of connection between each coil 1A and the electrode film 3 is thus improved.

The remaining portions of the wound wires of the second wire wound portions 13 embedded in the element body 2 after polishing of the second wire wound portions 13 may or may not have a spiral shape (for example, the number of turns may be smaller than one). That is to say, it is sufficient that the remaining portions of the second wire wound portions 13 are formed so as to extend in the circumferential direction around the winding axes AX. The remaining portions of the wound wires of the second wire wound portions 13 embedded in the element body 2 after polishing of the second wire wound portions 13 are also referred to as "connection portions". Each "connection portion" is a portion including one end portion connected to the end portion 12a or 12b of the linear portion 12 and another end portion connected to the electrode film 3.

The linear portions 12 may not necessarily have the linear shapes and may have, for example, circular arc shapes. It is sufficient that the linear portions 12 have shapes with less influences on the flow of the magnetic flux flowing out from between the wire wound portion 11 and the second wire wound portions 13.

The surface layer portion of the one main surface 2a of the element body 2 may be polished to expose portions of the one second wire wound portions 13 from the one main surface 2a of the element body 2 in the same or similar manner as the surface layer portion of the other main surface 2b of the element body 2. In this case, portions of the one second wire wound portions 13 located in the surface layer portion of the one main surface 2a of the element body 2 may also be polished. The areas in which the second wire wound portions 13 are connected to the electrode films 3 as the first or second input/output terminal are thus enlarged and reliability of connection between each coil 1A and the electrode film 3 is improved.

Figure 20:
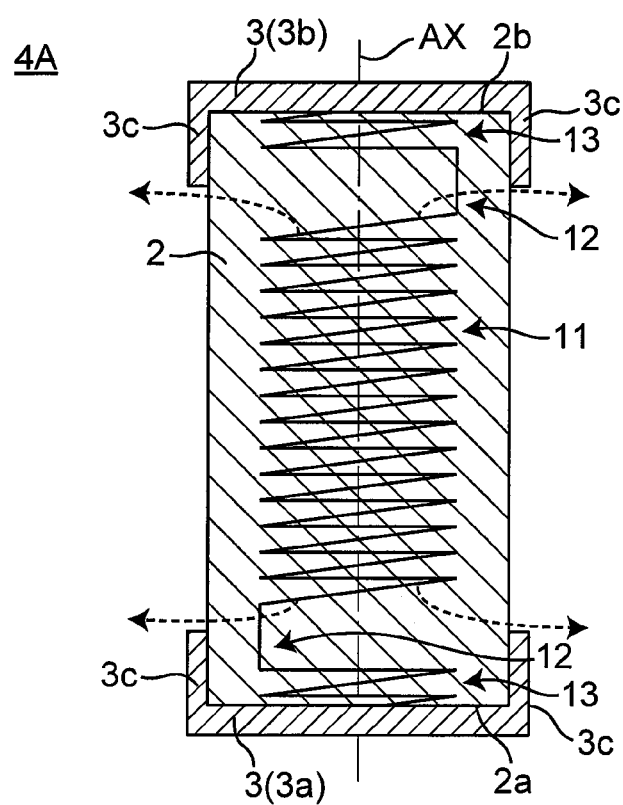
FIG. 20 is a cross-sectional view illustrating a variation of the coil component according to the second preferred embodiment of the present invention.

Although the electrode film 3 defining the first input/output terminal is formed on only the first surface 2a of the element body 2 and the electrode film 3 defining the second input/output terminal is formed on only the second surface 2b of the element body 2 in the above description, the present invention is not limited thereto. For example, as illustrated in FIG. 20, a coil component may include the folded portions 3c such that the electrode films 3 are also formed on the surfaces of the element body 2 other than the first surface 2a and the second surface 2b. In this case, it is preferable that the folded portions 3c are provided on lateral side portions of the second wire wound portions 13 but no folded portion 3c are provided on lateral side portions of the linear portions 12. With this configuration, the flow of the magnetic flux is not interfered with as indicated by arrows with dashed lines in FIG. 20 and influences by the second wire wound portions 13 on the flow of the magnetic flux is able to be reduced or prevented. Therefore, the performance of the coil component 4A is able to be further improved.

It is preferable that the wire member defining the wire wound portion 11 and the second wire wound portions 13 of the coil 1A be fixed by an insulating fixing material, such as resin, for example, provided between adjacent portions of the wire member. In this case, for example, even when a compression force in the winding axis direction is applied to the coils 1A during formation of the element body 2, deformation of the coils 1A is able to be reduced or prevented. The element body 2 is therefore able to be formed more easily without particularly regarding the deformation of the coils 1A.

It is preferable that each of the coils 1A is a longitudinally elongated coil with the lengthwise direction corresponding to the winding axis direction. In this case, the number of coils 1A that are able to be arranged in a specific area when seen from the thickness direction of the element body 2 is increased as compared to the case in which each of the coils 1A is a laterally elongated coil with the short-side direction corresponding to the winding axis direction. As a result, a larger number of coil components 4A is able to be manufactured in a shorter period of time.

Next, an example of a DC-to-DC converter 50 including the coil component 4 or 4A according to the first or second preferred embodiment will be described with reference to FIGS. 21 and 22.

Figure 21:
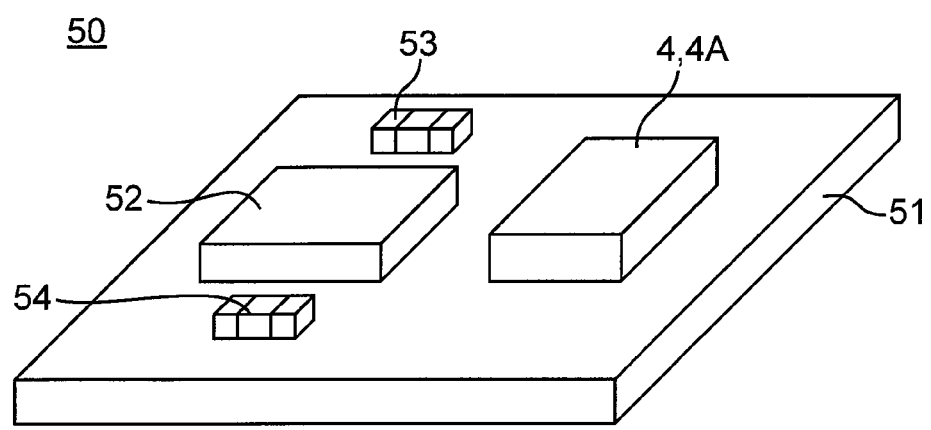
FIG. 21 is a perspective view illustrating a DC-to-DC converter including the coil component in FIG. 1 or FIG. 19.

FIG. 21 is a perspective view illustrating the DC-to-DC converter 50 including the coil component 4 or 4A. FIG. 22 is a circuit diagram illustrating the DC-to-DC converter 50 in FIG. 21.

The DC-to-DC converter 50 is a step-up/down DC-to-DC converter. The DC-to-DC converter 50 includes a switching element 52, the coil component 4 or 4A defines and functions as a choke coil, an input capacitor 53, and an output capacitor 54 are mounted on a printed wiring substrate 51, as illustrated in FIG. 21.

Figure 22:
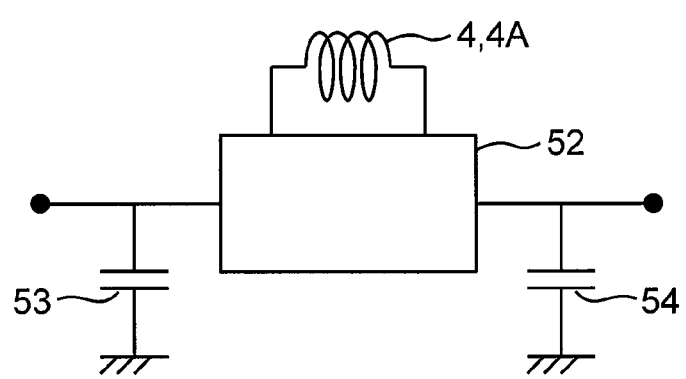
FIG. 22 is a circuit diagram illustrating the DC-to-DC converter in FIG. 21.

As illustrated in FIG. 22, the coil component 4 or 4A is connected to the switching element 52. One end of the input capacitor 53 is connected to an input terminal of the switching element 52. The other end of the input capacitor 53 is grounded. One end of the output capacitor 54 is connected to an output terminal of the switching element 52. The other end of the output capacitor 54 is grounded.

With this configuration, the DC-to-DC converter 50 includes the above-described coil component 4 or 4A. Therefore, performance, such as DC superimposition characteristics of the DC-to-DC converter 50, is improved, thus the DC-to-DC converter is capable of flowing a large current.

Although the present invention is sufficiently described with reference to the above preferred embodiments and the accompanying drawings, various variations and modifications thereof are may be made by those skilled in the art. It should be understood that the variations and modifications are encompassed in the present invention as long as they do not depart from the spirit and scope of the invention.

Appropriate combinations of various preferred embodiments of the present invention provide advantageous effects similar to the respective preferred embodiments described above.

Preferred embodiments of the present invention enable a plurality of coil components to be manufactured in a shorter period of time and is therefore effective for manufacturing a choke coil that is used for a DC-to-DC converter, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A coil component comprising:
   an element body having a rectangular or substantially rectangular parallelepiped shape and defined by a molded body including magnetic particles;
   a coil that is embedded in the element body such that a first end portion is exposed to a first surface of the element body and a second end portion is exposed to a second surface facing the first surface;
   a first input/output terminal provided on only the first surface and connected to the first end portion of the coil; and
   a second input/output terminal provided on only the second surface and connected to the second end portion of the coil; wherein
   the coil includes:
     a wire wound portion wound in a spiral shape around a winding axis;
     a connection portion that is separated from the wire wound portion and includes at least one of the first end portion that is connected to the first input/output terminal or the second end portion that is connected to the second input/output terminal; and
     a coupling portion coupling the wire wound portion and the connection portion; and
   the connection portion is defined by a second wire wound portion wound in a spiral manner around the winding axis.

2. The coil component according to claim 1, wherein the second wire wound portion includes the smaller number of turns than the wire wound portion.

3. The coil component according to claim 1, wherein the magnetic particles are magnetic metal powder and the element body is a green compact including the magnetic metal powder.

4. The coil component according to claim 1, wherein the coil is an air-core coil defined by a wound wire member.

5. The coil component according to claim 4, wherein the wire member is a copper-based wire member.

6. The coil component according to claim 4, wherein an insulating coating is provided on a surface of the wire member.

7. The coil component according to claim 1, wherein the element body includes about 85 vol % or greater of the magnetic particles.

8. A DC-to-DC converter comprising:
   a switching element; and
   a choke coil connected to the switching element; wherein
   the choke coil includes:
     an element body having a rectangular or substantially rectangular parallelepiped shape and defined by a molded body including magnetic particles;
     a coil that is embedded in the element body such that a first end portion is exposed to a first surface of the element body and a second end portion is exposed to a second surface facing the first surface;
     a first input/output terminal provided on only the first surface and connected to the first end portion of the coil; and
     a second input/output terminal provided on only the second surface and connected to the second end portion of the coil, and
   the coil includes:
     a wire wound portion wound in a spiral shape around a winding axis;
     a connection portion that is separated from the wire wound portion and includes at least one of the first end portion that is connected to the first input/output terminal or the second end portion that is connected to the second input/output terminal; and
     a coupling portion to couple the wire wound portion and the connection portion; and
   the connection portion is defined by a second wire wound portion wound in a spiral manner around the winding axis.

9. The DC-to-DC converter according to claim 8, wherein the second wire wound portion includes a smaller number of turns than the wire wound portion.

10. The DC-to-DC converter according to claim 8, wherein the magnetic particles are magnetic metal powder and the element body is a green compact including the magnetic metal powder.

11. The DC-to-DC converter according to claim 8, wherein the coil is an air-core coil defined by a wound wire member.

12. The DC-to-DC converter according to claim 11, wherein the wire member is a copper-based wire member.

13. The DC-to-DC converter according to claim 11, wherein an insulating coating is provided on a surface of the wire member.

14. The DC-to-DC converter according to claim 8, wherein the element body includes about 85 vol % or greater of the magnetic particles.

* * * * *